United States Patent [19]

Esser

[11] Patent Number: 5,586,476
[45] Date of Patent: Dec. 24, 1996

[54] PROCESS AND DEVICE FOR MACHINING BARS, TUBES OR TUBE BLANKS

[75] Inventor: Karl-Joseph Esser, Mönchengladbach, Germany

[73] Assignee: Mannesmann Aktiengesellschaft, Dusseldorf, Germany

[21] Appl. No.: 438,348

[22] Filed: May 10, 1995

[30] Foreign Application Priority Data

May 10, 1994 [DE] Germany .................. 44 16 771.7

[51] Int. Cl.⁶ ...................... B23B 5/08; B23B 5/12
[52] U.S. Cl. ............... 82/1.11; 82/127; 82/131; 409/166; 409/199; 409/203
[58] Field of Search ............... 82/1.11, 18, 131, 82/127; 407/119; 409/163, 166, 167, 183, 199, 201, 202, 203, 205, 206, 211

[56] References Cited

U.S. PATENT DOCUMENTS

| | | | |
|---|---|---|---|
| 3,866,495 | 2/1975 | Goeke | 82/1.11 |
| 4,417,379 | 11/1983 | Goode | 409/201 X |
| 4,448,591 | 5/1984 | Ohno | 407/119 X |
| 4,552,491 | 11/1985 | Parker | 407/119 X |
| 4,638,693 | 6/1987 | Sugimoto | 82/127 |
| 4,819,525 | 4/1989 | Rabe | 82/1.11 |
| 5,255,581 | 10/1993 | Glomd et al. | 82/131 X |

FOREIGN PATENT DOCUMENTS

| | | | |
|---|---|---|---|
| 0202703 | 11/1983 | Japan | 82/18 |
| 0295101 | 12/1988 | Japan | 82/1.11 |
| 476206 | 12/1937 | United Kingdom | 82/18 |

Primary Examiner—Daniel W. Howell
Assistant Examiner—Henry Tsai
Attorney, Agent, or Firm—Cohen, Pontani, Lieberman, Pavane

[57] ABSTRACT

A process and device for machining bars, tubes or tube blanks, especially strand-cast copper blanks, in which the work piece to be machined—supported in the cross-plane of the metal-cutting device is cut on its periphery and along its length, while the die and the work piece are continually moved relative to one another in the longitudinal direction of the work piece. At least one die rotates concentrically around the work piece, which is held in a rotation-proof manner, on a plane inclined toward the longitudinal axis of the work piece and with its cutters simultaneously machines two areas of the work piece surface that are located opposite to one another.

11 Claims, 3 Drawing Sheets

PROCESS AND DEVICE FOR MACHINING BARS, TUBES OR TUBE BLANKS

SUMMARY OF THE INVENTION

The object of the present invention is to provide a process for outwardly machining long round cross-sections, such as cast copper blanks, for example, at extremely high advance speeds while maintaining good surface qualities and in a manner which maintains tolerances. The process should also permit the use of units that can be automated. It should also be possible to cut long labile work pieces without deformation.

Pursuant to this object, and others which will become apparent hereafter, one aspect of the present invention resides in a process which at least one die rotates concentrically around the work piece on a plane inclined to the longitudinal axis of the work piece and, with its cutters, simultaneously machines two areas of the work piece surface, which are located opposite to one another. The invention thus consists of simultaneously machining two opposite peripheral areas of the work piece with one die, whereby the metal-cutting forces introduced on the opposite sides, which act transversely to the work piece, neutralize one another. Special advantages result when, according to a further embodiment of the invention, two directly adjacent dies rotate concentrically around the work piece on two different planes and the two planes are inclined toward the common longitudinal axis of the work in directions which are offset from one another by approximately 90 degrees.

The inventive process makes it possible to machine the entire outer periphery of the work piece using only two dies, whereby the slight inclination of the die planes and the offset of their inclination directions by 90 degrees creates a polygonal cross-section, consisting of four elliptical arcs which are located, in pairs, opposite to one another. The two dies also allow very high advance speeds to be achieved, while a work piece length is machined only once and four adjacent peripheral areas of the work piece are machined simultaneously.

When, according to a further feature of the inventive process, the dies rotate around the longitudinal axis of the work piece in opposite directions, the metal-cutting forces acting in the peripheral direction as well as the forces acting transversely to the work piece are automatically neutralized. The remaining forward motion forces in the longitudinal direction of the work piece are low.

A device to carry out the process, pursuant to the present invention, has dies designed as inner cutters, the inner diameter of which between the die blades is slightly larger than the outer diameter of the work piece to be cut.

Given an inner diameter between the die blades which is only slightly larger than the outer diameter of the work piece to be cut, the result, when the die is inclined, is the polygonal cross-sectional form described above. The smaller the inclination of the die to the longitudinal axis of the work piece, the more closely this polygonal cross-section approaches a circle. Preferably, the inclination of the die is permanently set, while the inner diameter is adjustable. This makes it possible to combine stable machine construction with the possibility of varying the outer diameter to be machined by adjusting the blades of the inner cutter. When the die is precisely set to the longitudinal axis of the work piece and the cutter diameters on the die heads are precisely adjusted, high accuracy in wall thicknesses can be attained.

According to a further embodiment of the invention, in order to guarantee accurate machining, the work piece resting on guidance rollers can be fixed on both sides of the dies in a rotation-proof fashion on the face and axially by means of clamping and holding rods. It should be noted that the guides extend as closely as possible to the dies and the dies rotate as closely as possible to one another. The clamping and holding rods are simultaneously responsible for guiding the work piece into the machine prior to machining.

According to another embodiment of the invention, at least the entry side of the work piece into the dies is designed as a guidance bush for the work piece. The guidance bush includes guides which are adjustable automatically and in a play-free manner, and guide the work piece in a centered fashion. Such a guidance bush ensures the precisely centered entry of the bars, tubes or tube blanks and thus helps to maintain required tolerances.

In the framework of the invention, it is equally conceivable for the milling unit, consisting of the dies and the guides for the work piece, to be moved relative to the work piece in the longitudinal direction or for the work piece to be moved relative to the dies.

The advantages of the present invention are that an unusual increase in forward motion performance can be achieved, compared to the prior art, in a machine of compact construction and with only two cutters. Short support lengths between the guidance rollers and the force-neutral process permit the surfaces of the work piece to be machined in a manner especially conducive to maintaining tolerances, so that all in all a compact, stable and economical solution has been created.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
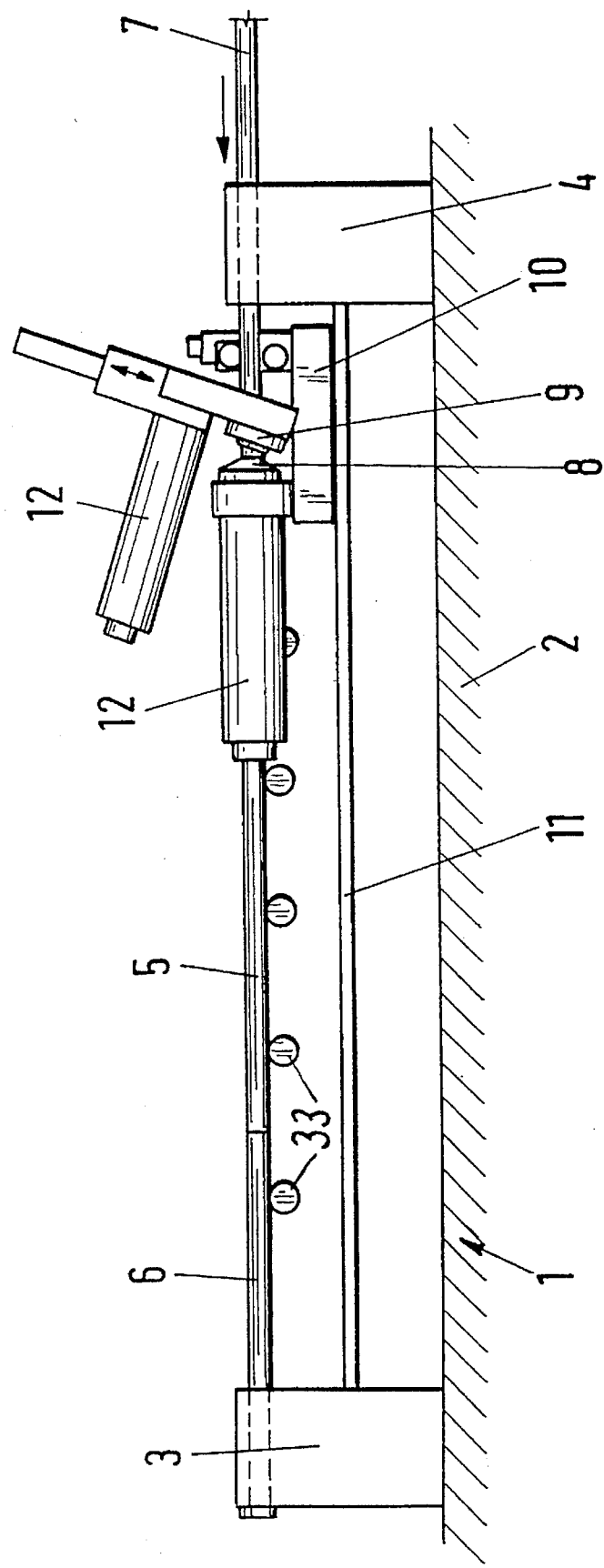
FIG. 1 is a side view of a milling device for carrying out the process according to the invention.

The drawings are simplified depictions of a device according to the invention and are meant to illustrate its principle. FIG. 1 shows a milling machine 1 arranged on a foundation 2. The milling machine 1 accommodates a work piece 5 to be machined between two lateral posts 3, 4. The work piece 5 is clamped and held between two clamping and holding rods 6, 7, which will be described in greater detail below. The work piece 5 rests, like the clamping and holding rod 6, on guidance rollers 33, which prevent bending between the clamps.

The machining of the work piece 5 is carried out by dies 8, 9, which are arranged on a die carrier 10, which is provided to be continuously movable on a guide path 11 in the longitudinal direction of the work piece. According to the invention, the dies 8, 9 are arranged in an inclined fashion and are rotary-driven via respective drives 12, which are not described in more detail and are within the knowledge of those skilled in the art.

Figure 2:
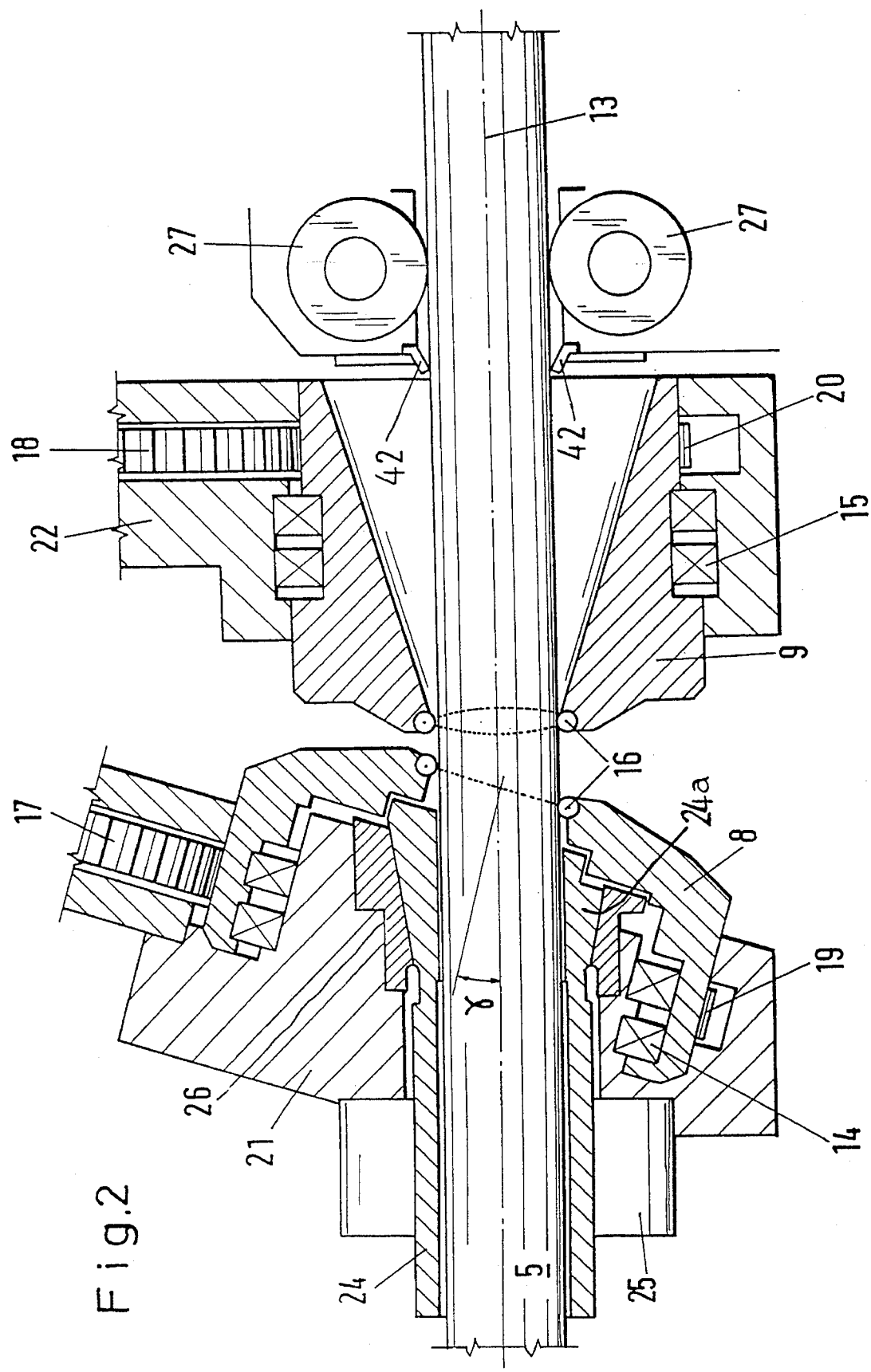
FIG. 2 is an enlarged depiction of the cutting dies.

FIG. 2 shows—again, very schematically—a top view of the dies 8, 9. It can be seen that both dies are inclined toward the longitudinal axis 13 of the tube; specifically, both dies are inclined at an angle γ, as can be seen in the case of die 8, shown on the left of FIG. 2. The die 9 is inclined at the same angle, concentric to the longitudinal axis 13 of the tube and vertical to the plane of the drawing. The dies 8, 9 mounted at bearings 14, 15 are designed as inner cutters and have, distributed on their inner periphery, cutting disks 16 which cut the peripheral surface of the work piece 5. The inner radius between the cutting disks 16 as well as the angle γ of the dies 8, 9 are chosen so that when the dies 8, 9 rotate around the work piece 5, the respective work piece areas located across from the cutting disks 16 are machined. Because the angles of the die planes of both dies are set in directions which are offset to one another by 90 degrees, four peripheral areas of the work piece 5 are machined at the same time. When, as foreseen, the inner diameter between the cutting disks 16 is only slightly larger than the outer diameter of the work piece 5 and the selected angle γ is suitably small, a slightly polygonal cross-section is achieved in the work piece 5, with gentle transitions between the four polygon sides. A cross-section of this type, which has been cut into a slightly polygonal profile, is suitable for further processing, i.e., the fact that the cross-section of the milled work piece 5 is not circular does no harm.

As described above, the dies 8, 9 rotate in opposite directions, so that the forces striving to turn the work piece neutralize one another. Because of this, guiding and holding the work piece is relatively simple. The dies 8, 9 are driven via a gearing (not shown) by spur gears 17, 18, which engage into serrations 19, 20 on the dies 8, 9. The bearings 14, 15 rest against die carriers 21, 22, which are connected to the die carrier 10.

In order to machine the surface of the work piece 5 accurately and with the minimum amount of metal being removed, the work piece must be held exactly in the center of the rotating dies 8, 9. To this end, the entry side of the device is equipped with a guide bush 24, which consists of eight segments lying on the surface of the work piece and distributed on its periphery. In the front (right-hand) area of the bush 24, the bush is provided on its outer periphery with a cone-shaped segment 24a, which rests against a cone-shaped member 26 of similar design on the die carrier 21. By moving the bush 24 in the longitudinal direction of the work piece 5 with the help of, for example, a piston-cylinder unit (not described further), at 25, the cone-shaped segments of the bush 24 can be pushed against the cone-shaped member 26 and thus clamped against the surface of the work piece 5. In this way, the work piece 5 can be set and guided in the exact center, whereby the clamping strengths are chosen in such a way that forward movement by the work piece 5 or by the die carrier 10 relative to the surface of the work piece 5 is possible.

On the exit side of the device according to the invention, there are withdrawal rollers 27, which guide the clamping and holding rod 7 and/or the work piece 5 and draw the work piece in and out at the beginning and the end of the work sequence. The housings that carry the withdrawal rollers 27 are equipped with strips 42 which are arranged to prevent cut metal chips from getting between the surface of the work piece 5 and the withdrawal rollers 27 and being pressed into the soft material there.

Figure 3A:
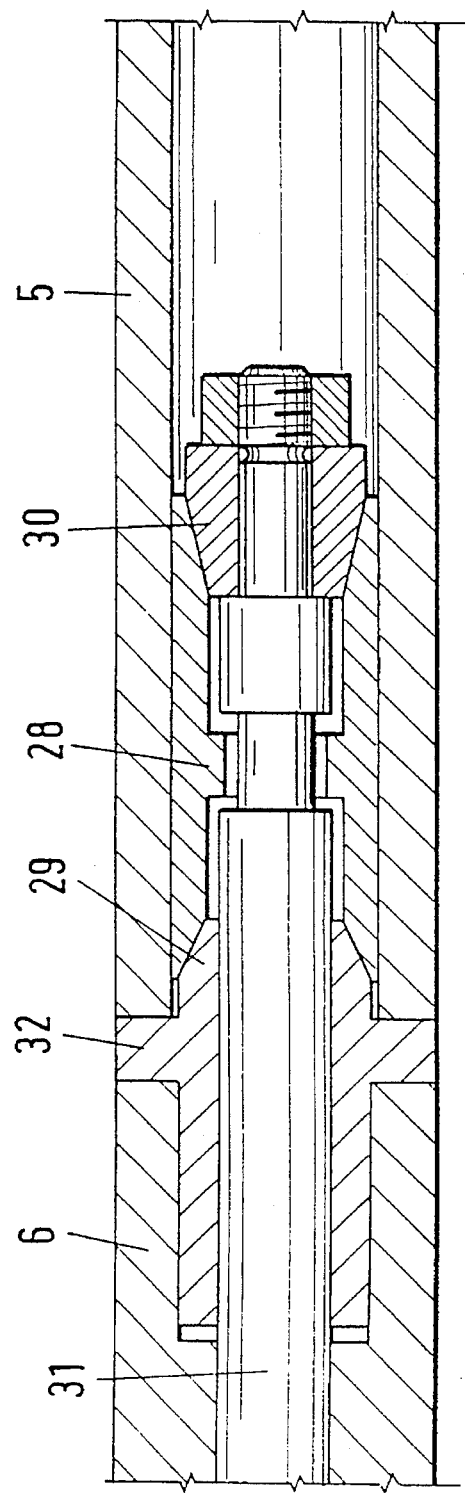
FIGS. 3a & 3b show the clamping and holding rods for holding the work piece.

FIG. 3a illustrates, in schematic fashion, the principle of the clamping and holding rods 6, 7. The work piece 5 is placed onto the clamping and holding rod 6 (left, in FIG. 1) and is clamped on its own inner surface by means of clamping segments 28 via conically surfaced elements 29, 30, which are activated with the help of a drawing bar 31. In this way, the work piece 5 can be held by the clamping and holding rod 6 so that it cannot rotate in the peripheral direction and can also be axially clamped by an annular intermediate part 32, which clamps against the faces of the work piece 5, without it being necessary for clamping and holding means to act upon the outer periphery of the work piece 5. It is thus possible to machine the work piece 5 all the way to its end.

Figure 3B:
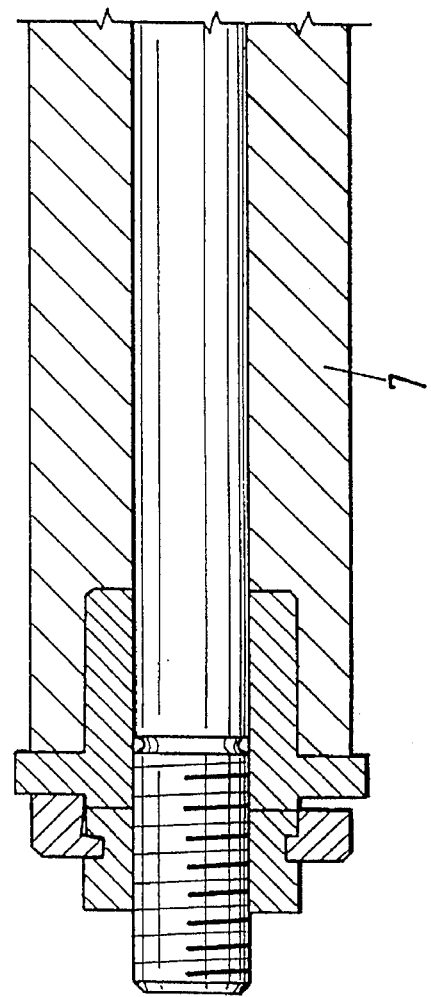

The clamping and holding rod 7, which is partially shown in FIG. 3b, acts upon the other side of the work piece 5. The work piece is clamped between the clamping and holding rods 6, 7, while the die carrier 10 with the dies 8, 9 travels continually across the length of the work piece. As the die carrier 10 advances, the respective guidance rollers 33 are swung away, and after passing of the work piece they are swung back, in order to achieve the most secure support possible.

With only two cutting dies 8, 9, the invention provides a compact unit across the length of the work piece, with short support lengths between the guidance rollers 33. Apart from the forward motion forces on the work piece 5, the process is force-neutral, because the dies 8, 9, which rotate in opposite directions, neutralize their respective turning moments. This simplifies the drive and works to the benefit of the accuracy of the cutting process, so that excellent tolerances can be expected. The work piece 5 is machined simultaneously with two dies on four peripheral areas, thereby increasing the efficiency of the milling procedure, so that complete external machining can be carried out in the shortest possible time with only one process route across the length of the work piece 5. To set the metal removal for the outer peripheral surface of the work piece 5, the dies 8, 9 and/or the cutting disks 16 can be adjusted, whereby automated adjustment is conceivable. Because the dies 8, 9 rotate in opposite directions, arresting the work piece against rotation can largely be dispensed with. It is necessary for turning moments to be held briefly only at the beginning of the machining sequence, when only one die 8 or 9 is engaged. This purpose is served by the clamping and holding rods 6, 7, which are supported by the bush 24. The bush 24 serves to accurately guide the work piece 5 in the area of the dies 8, 9, whereby it is especially advantageous that the bush 24 extends close to the cutting plane of the dies. The slight positioning angle of the dies 8, 9 relative to the work piece axis leads to no noticeable bending forces in the work piece, especially since machining is carried out simultaneously on two opposite sides of the work piece. It is necessary to absorb only the forward motion forces acting in the work piece center, which can easily be transmitted with sufficient rigidity.

The invention is not limited by the embodiments described above which are presented as examples only but can be modified in various ways within the scope of protection defined by the appended patent claims.

I claim:

1. A process for machining an elongate work piece, comprising the steps of: holding the work piece in a non-rotatable manner, cutting the work piece on its periphery and along its length with a metal cutting device including at least one die having cutters; and simultaneously continually moving the die and the work piece relative to one another in a longitudinal direction of the work piece, the cutting step including rotating two directly adjacent dies concentrically around the work piece on two different planes that are inclined toward a common longitudinal axis of the work piece in directions offset to one another by 90 and simultaneously machining two areas of the work piece surface that are located opposite to one another with the cutters.

2. A process as defined in claim 1, wherein the cutting step includes rotating the dies around the longitudinal axis of the work piece in opposite directions.

3. A device for machining an elongate work piece, comprising:

means for holding the work piece in a non-rotatable manner;

die means for cutting an outer surface of the work piece, said die means including inner cutters that have an inner diameter that is slightly larger than an outer diameter of the work piece to be cut, the die means being operative to rotate concentrically around the work piece on a plane inclined toward the longitudinal axis of the work piece so as to simultaneously machine two areas of the work piece surface that are opposite to one another;

a plurality of guidance rollers arranged in the longitudinal direction of the work piece so that the work piece can rest on the guidance rollers, the holding means including clamping and holding rods arranged to hold the work piece axially and on its end face on both sides of the die in a rotation-proof manner, the work piece and the clamping and holding rods being tubular;

a drawing bar passable through the clamping and loading rods as well as the work piece;

a clamping member having an annulus and a first end with a conical surface, the clamping member further having a longitudinal bore therethrough whereby the segment can be slid onto the drawing bar;

a conical element mounted to a free end of the drawing bar at a distance from the clamping member; and a clamping segment arranged on the drawing bar between the clamping member and the conical element whereby the conical surfaces of the clamping member and the conical element force the clamping segment radially outward whereby the work piece is clamped, the annulus of the clamping member having opposed surfaces that respectively engage in axial end face of the work piece and one of the clamping and holding rods.

4. A device as defined in claim 3, wherein the inner cutters have an adjustable inner diameter.

5. A device as defined in claim 3, and further comprising a guide bush provided at a side of the dies at which the work piece can enter, said guide bush having an adjustable guide so that the guide bush is operative to guide the work piece in a centered fashion.

6. A device as defined in claim 5, wherein the die means and the guide bush are arranged and adapted to be movable relative to the work piece in the longitudinal direction of the: work piece.

7. A device as defined in claim 3, and further comprising means for moving the work piece, which is clamped in a rotation-proof manner and axially, relative to the dies in the longitudinal direction of the work piece.

8. A device as defined in claim 3, wherein the inner cutters are cutting disks.

9. A device as defined in claim 3, and further comprising a die carrier operatively arranged to travel in the longitudinal direction of the work piece, the die means being mounted to the die carrier.

10. A device for machining an elongate work piece, comprising:

means for holding the work piece in a non-rotatable manner; and die means for cutting an outer surface of the work piece, said die means including inner cutters that have an inner diameter that is slightly larger that an outer diameter of the work piece to be cut, the die means being operative to rotate concentrically around the work piece on a plane inclined toward the longitudinal axis of the work piece so as to simultaneously machine two areas of the work piece surface that are opposite to one another, said die means including two dies having cutters, which dies are operative to cut the work piece on its periphery and along its length, the dies being directly adjacent and concentrically rotatable around the work piece on two different planes that are inclined to a common work piece longitudinal axis in directions offset to one another by 90°; and means for simultaneously continually moving a die and the work piece relative to one another in a longitudinal direction of the work piece.

11. A device as defined in claim 10, wherein the die means includes dies that are rotatable in opposite directions around the longitudinal axes of the work piece.

* * * * *